(12) United States Patent
Rufolo, Jr.

(10) Patent No.: US 12,484,550 B1
(45) Date of Patent: Dec. 2, 2025

(54) PET APPARATUS AND METHOD

(71) Applicant: Joseph Rufolo, Jr., Hillsborough, NJ (US)

(72) Inventor: Joseph Rufolo, Jr., Hillsborough, NJ (US)

( * ) Notice: Subject to any disclaimer, the term of this patent is extended or adjusted under 35 U.S.C. 154(b) by 0 days.

(21) Appl. No.: 19/234,834

(22) Filed: Jun. 11, 2025

(51) Int. Cl.
*A01K 15/02* (2006.01)
*A01K 1/035* (2006.01)
*G08B 3/00* (2006.01)

(52) U.S. Cl.
CPC .............. *A01K 15/02* (2013.01); *A01K 1/035* (2013.01); *G08B 3/00* (2013.01)

(58) Field of Classification Search
CPC ............... A01K 15/02; A01K 15/0201; A01K 15/0203; A01K 15/0207; A01K 15/025; A01K 15/0252; A01K 15/0257; A01K 15/0258; A01K 1/035; A01K 15/024; G10D 13/06; G10D 13/10
See application file for complete search history.

(56) References Cited

U.S. PATENT DOCUMENTS

| | | | | |
|---|---|---|---|---|
| 3,657,465 A | * | 4/1972 | Koishikawa | G10D 13/24 984/151 |
| 3,747,462 A | * | 7/1973 | Mizuno | G10D 13/10 984/154 |
| 5,038,703 A | * | 8/1991 | Frush | G10K 1/071 116/148 |
| 5,465,682 A | * | 11/1995 | Chavallo, Jr. | A01K 15/025 119/498 |
| D606,713 S | * | 12/2009 | Kellogg | D30/160 |
| D608,242 S | * | 1/2010 | Chen | D11/121 |
| 8,137,768 B1 | * | 3/2012 | Chen | A47G 33/00 428/7 |
| 2007/0101923 A1 | * | 5/2007 | Pedersen | A01K 15/02 116/170 |
| 2008/0282993 A1 | * | 11/2008 | Hoehn | A01K 15/02 119/712 |

(Continued)

FOREIGN PATENT DOCUMENTS

KR 20180007847 A * 1/2018 ........... A01K 1/0157

OTHER PUBLICATIONS

Erica, "DIY Lace Tambourine" Sep. 3, 2014, Honestlywtf.com https://honestlywtf.com/diy/diy-lace-tambourine/ (Year: 2014).*

(Continued)

*Primary Examiner* — Katelyn T Truong
(74) *Attorney, Agent, or Firm* — Walter J. Tencza, Jr.

(57) ABSTRACT

An apparatus including a first turf section and one or more bells connected to the first turf section; wherein contacting the apparatus causes the one or more bells to ring. The apparatus may further include a second turf section; wherein the one or more bells are between the first turf section and the second turf section. The one or more bells may include a plurality of bells; and each of the plurality of bells may be in a first plane. The plurality of bells may substantially define a closed geometric shape. A method is also provided which may include teaching a pet to contact the apparatus so that the apparatus will ring, when the pet needs to urinate or defecate; and in response to the pet contacting the apparatus, opening a door to let a pet go outside of a building to allow the pet to urinate or defecate.

20 Claims, 14 Drawing Sheets

(56) References Cited

U.S. PATENT DOCUMENTS

| | | | | |
|---|---|---|---|---|
| 2009/0004409 | A1* | 1/2009 | McCoy | A01K 15/02 |
| | | | | 428/17 |
| 2009/0283054 | A1* | 11/2009 | Reyes | A01K 15/02 |
| | | | | 119/719 |
| 2012/0137957 | A1* | 6/2012 | Lamprey, Jr. | A01K 15/025 |
| | | | | 116/139 |
| 2017/0071160 | A1* | 3/2017 | Hajalie | A01K 1/0353 |
| 2017/0172108 | A1* | 6/2017 | Long, Jr. | A01K 15/024 |
| 2019/0048653 | A1* | 2/2019 | Langstroth | A01K 15/02 |
| 2021/0176968 | A1* | 6/2021 | Bager | A01K 29/005 |
| 2022/0084373 | A1* | 3/2022 | Beem, Jr. | G10K 1/071 |
| 2023/0368755 | A1* | 11/2023 | du Blêt | G10D 13/02 |

OTHER PUBLICATIONS

Westeraj, "DIY Tambourine" Jun. 3, 2023 (Wayback Machine), Instructables https://www.instructables.com/DIY-Tambourine/ (Year: 2023).*

* cited by examiner

PET APPARATUS AND METHOD

FIELD OF THE INVENTION

This invention relates to devices for teaching pets.

BACKGROUND OF THE INVENTION

There are various devices for teaching pets known in the art.

SUMMARY OF THE INVENTION

In at least one embodiment an apparatus is provided comprising: a first turf section; and one or more bells connected to the first turf section; and wherein contacting the first turf section causes one or more of the one or more bells to ring.

The apparatus may further include a second turf section; and wherein the one or more bells are connected to the second turf section; and wherein the one or more bells are between the first turf section and the second turf section.

In at least one embodiment, the one or more bells include a plurality of bells; and each of the plurality of bells is in one a first plane. The plurality of bells may substantially define a closed geometric shape, such as a six sided closed geometric shape.

In at least one embodiment, a method is provided which may include teaching a pet to contact an apparatus so that the apparatus will ring, when the pet needs to urinate or defecate; and in response to the pet contacting the apparatus to cause the apparatus to ring, opening a door to let a pet go outside of a building to allow the pet to urinate or defecate. The apparatus for use with the method may be a previously described.

DETAILED DESCRIPTION OF THE DRAWINGS

Figure 1:
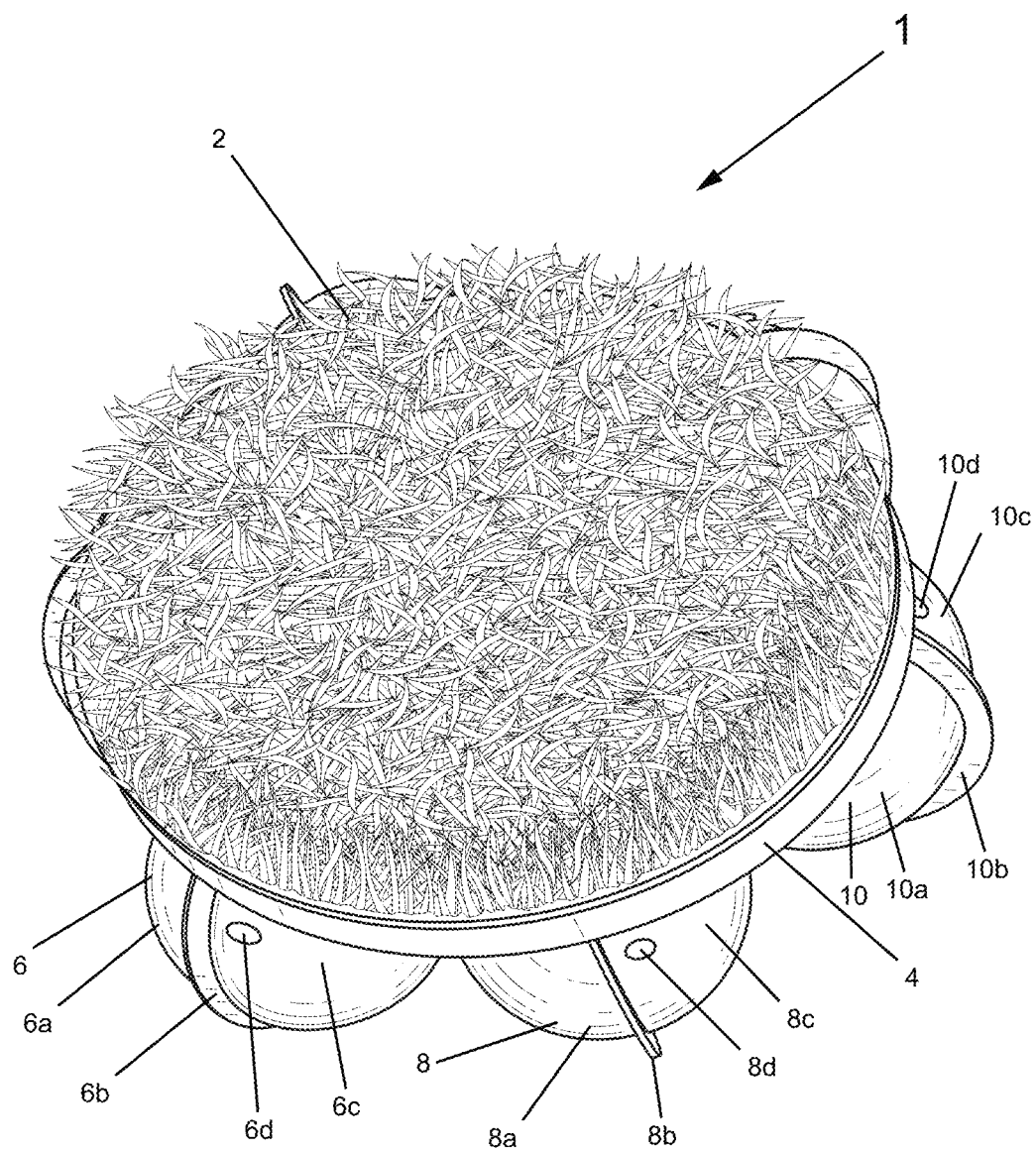
FIG. 1 is a right side, top, and front perspective view of a pet apparatus, in accordance with an embodiment of the present invention.
Figure 2:
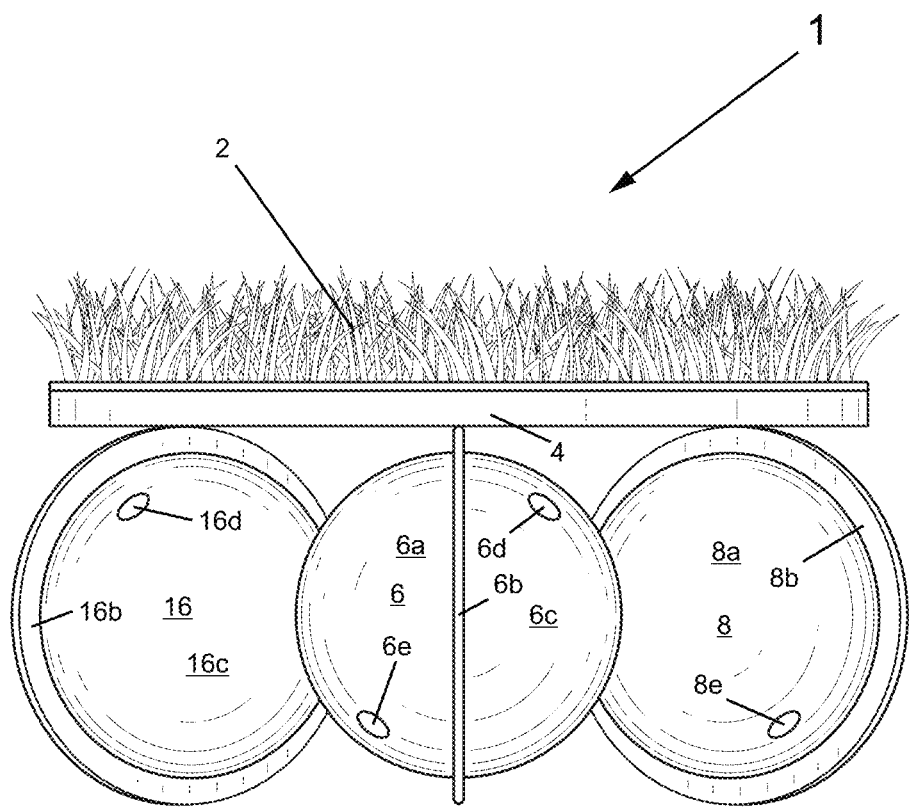
FIG. 2 is a front elevational view of the pet apparatus of FIG. 1.
Figure 3:
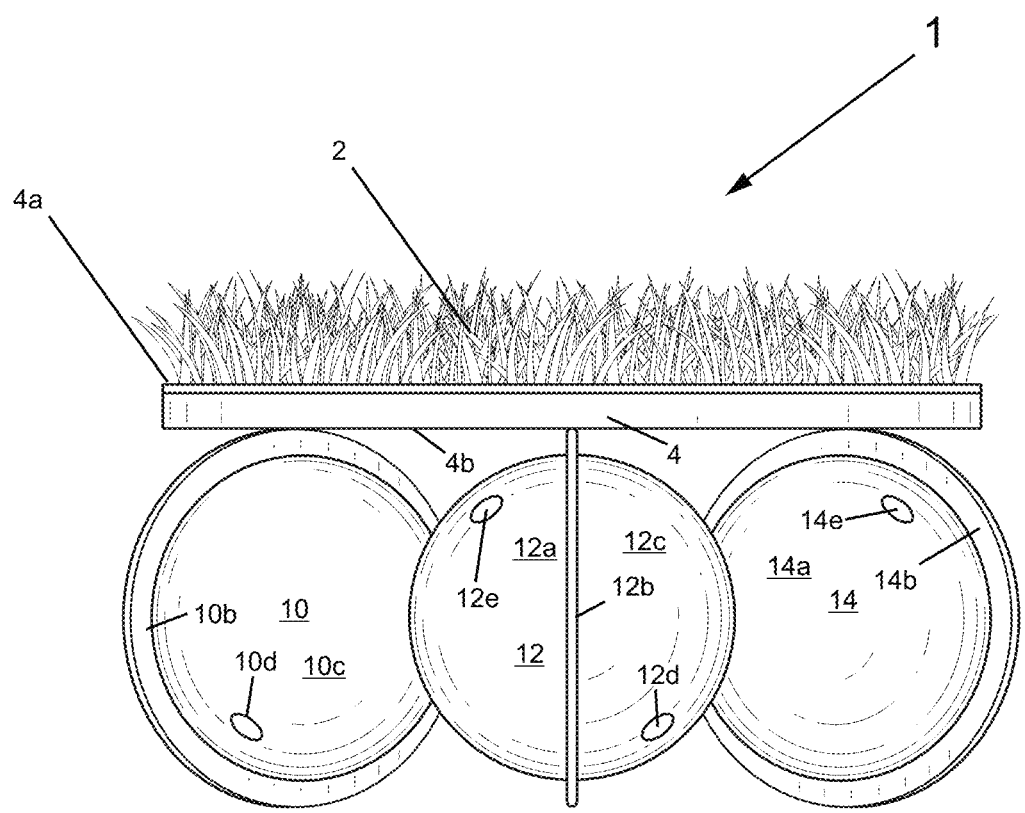
FIG. 3 is a rear elevational view of the pet apparatus of FIG. 1.
Figure 4:
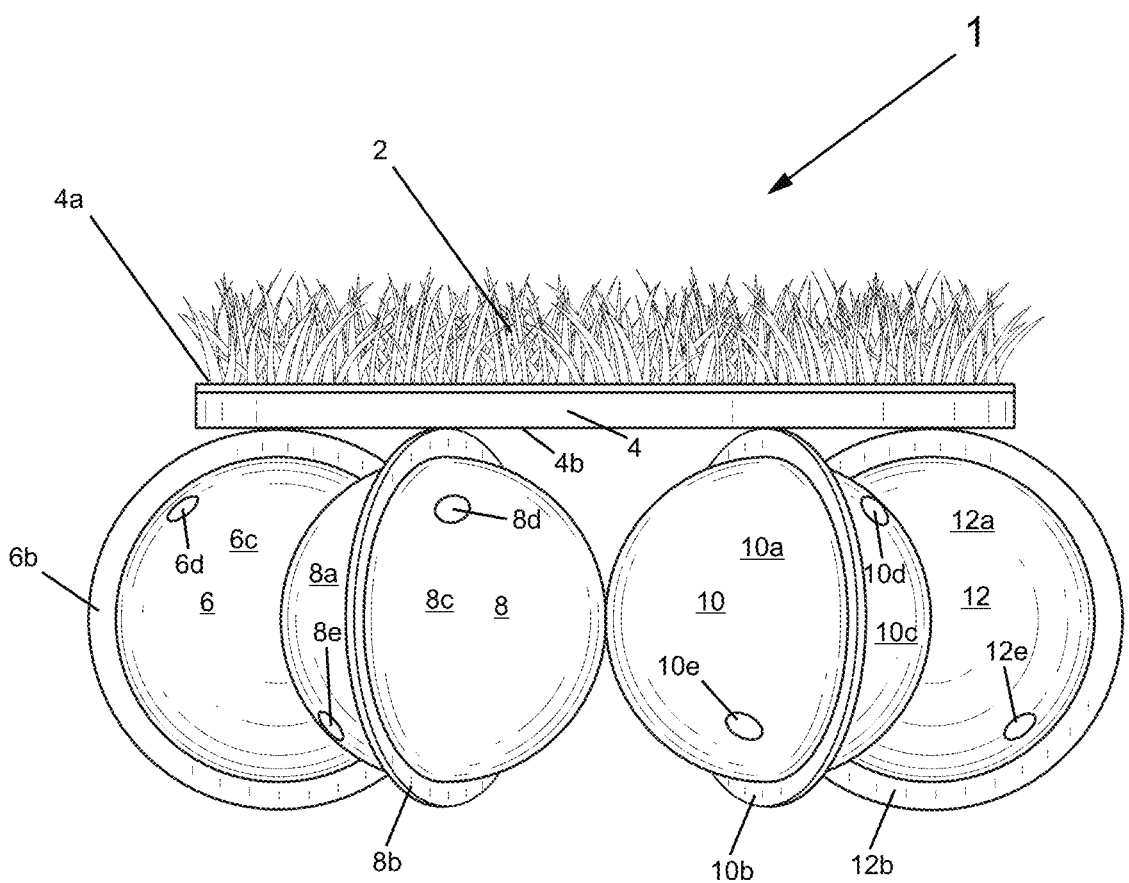
FIG. 4 is a right side elevational view of the pet apparatus of FIG. 1.
Figure 5:
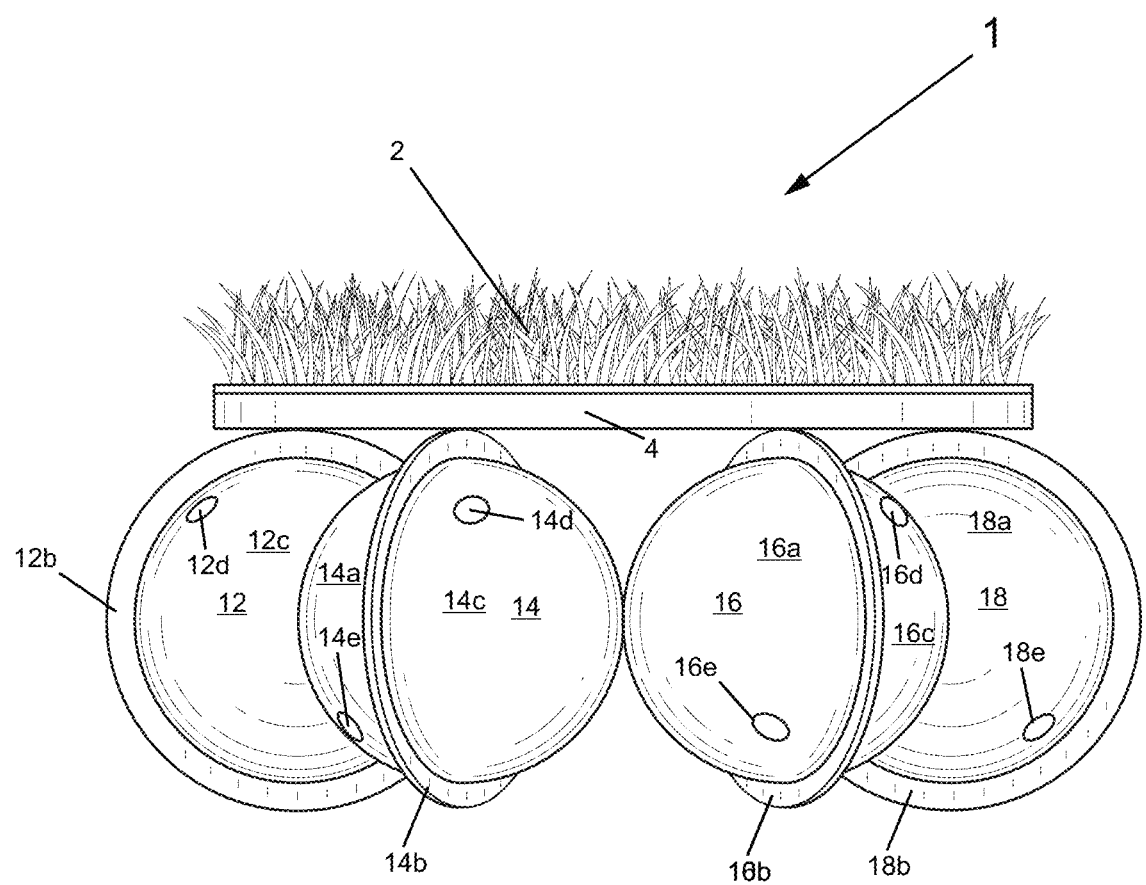
FIG. 5 is a left side elevational view of the pet apparatus of FIG. 1.
Figure 6:
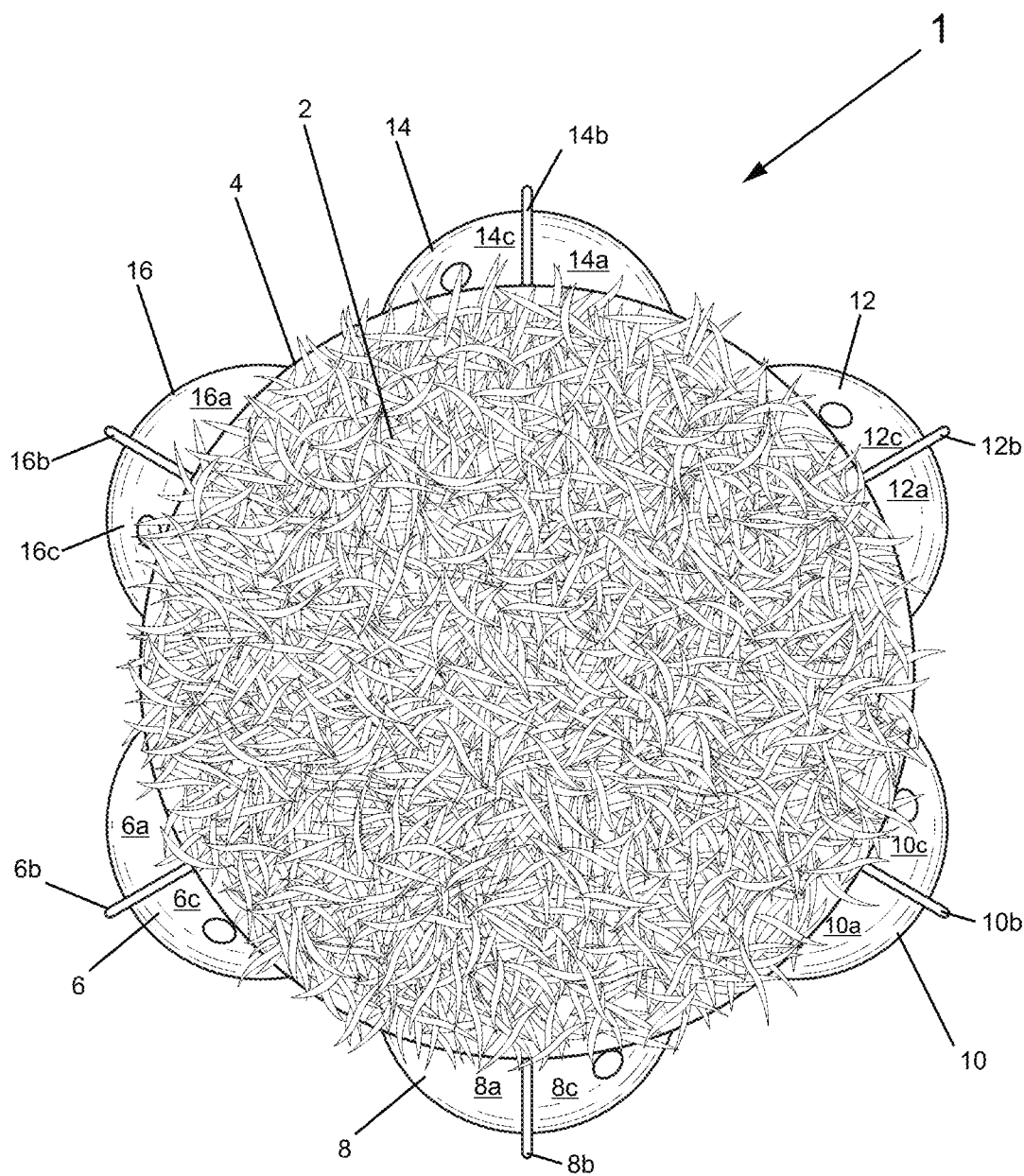
FIG. 6 is a top plan view of the pet apparatus of FIG. 1.
Figure 7:
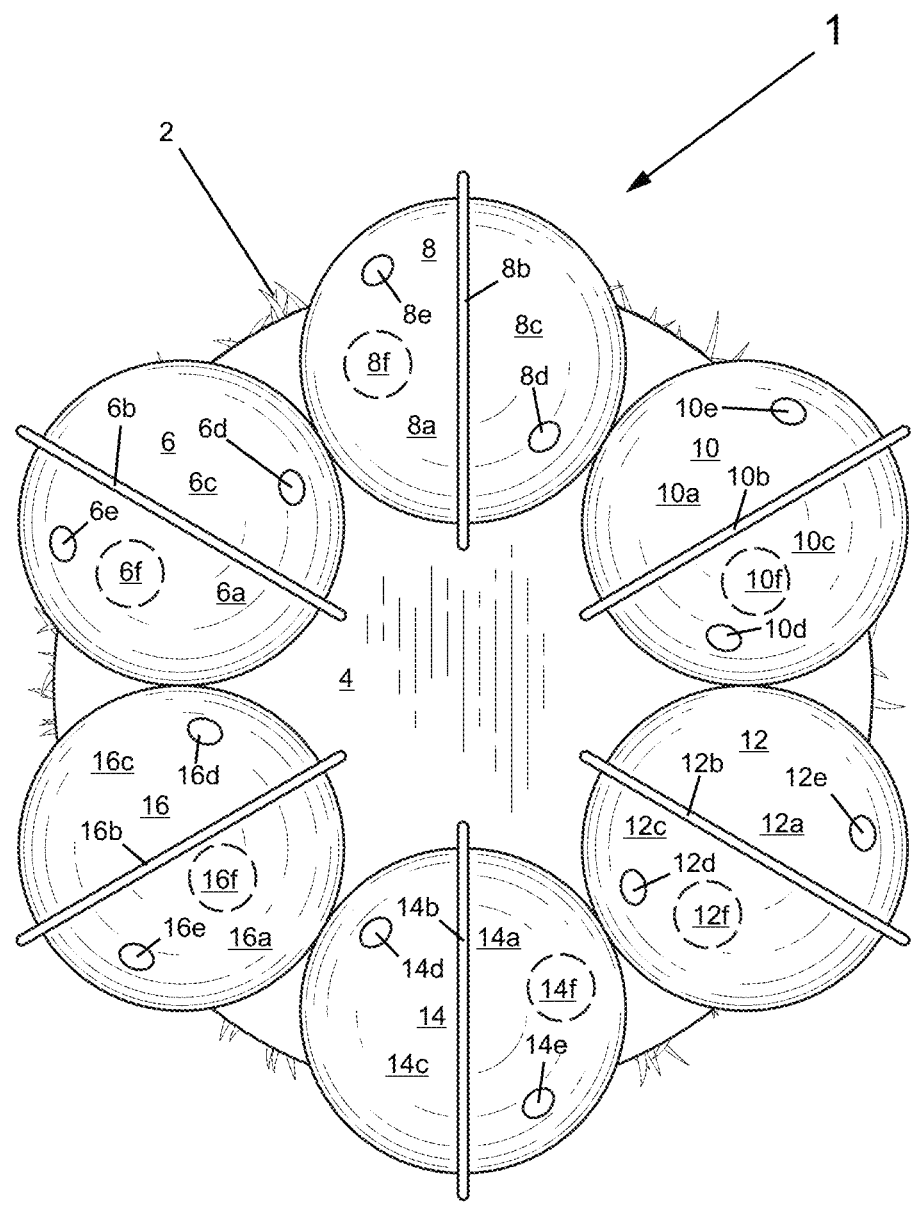
FIG. 7 is a bottom plan view of the pet apparatus of FIG. 1.

FIG. 1 is a right side, top, and front perspective view of a pet apparatus 1, in accordance with an embodiment of the present invention. FIG. 2 is a front elevational view of the pet apparatus 1 of FIG. 1. FIG. 3 is a rear elevational view of the pet apparatus 1 of FIG. 1. FIG. 4 is a right side elevational view of the pet apparatus 1 of FIG. 1. FIG. 5 is a left side elevational view of the pet apparatus 1 of FIG. 1. FIG. 6 is a top plan view of the pet apparatus 1 of FIG. 1. FIG. 7 is a bottom plan view of the pet apparatus 1 of FIG. 1.

As shown by FIGS. 1-7 the pet apparatus 1 includes section of artificial turf 2, which is fixed to a top side or surface 4a (shown by FIG. 3) of a base 4. The pet apparatus 1 also includes bells 6, 8, 10, 12, 14, and 16, which are fixed to bottom side or surface 4b (shown by FIG. 3) of the base 4.

The base or disc 4 may be made of wood, rubber, and or metal. The turf section 2 and/or turf section 102, shown in FIG. 12, may be made of a known artificial turf material. The bells 6, 8, 10, 12, 14, and 16 may be made of metal.

Each of bells 6, 8, 10, 12, 14, and 16 may be identical to each other.

Bell 6 may include hemispheres or substantially shaped as hemispheres 6a and 6c which are connected together by flange 6b. The flange 6b may be fixed to the bottom side or surface 4b, as shown, for example, by FIG. 4. The hemispheres 6a and 6c may be fixed to adjacent hemispheres 8a, and 16c, respectively, as shown by FIG. 7.

Bell 8 may include hemispheres or substantially shaped as hemispheres 8a and 8c which are connected together by flange 8b. The flange 8b may be fixed to the bottom side or surface 4b, as shown, for example, by FIG. 4. The hemispheres 8a and 8c may be fixed to adjacent hemispheres 6c and 10a, respectively, as shown by FIG. 7.

Bell 10 may include hemispheres or substantially shaped as hemispheres 10a and 10c which are connected together by flange 10b. The flange 10b may be fixed to the bottom side or surface 4b, as shown, for example, by FIG. 4. The hemispheres 10a and 10c may be fixed to adjacent hemispheres 8c and 12a, respectively, as shown by FIG. 7.

Bell 12 may include hemispheres or substantially shaped as hemispheres 12a and 12c which are connected together by flange 12b. The flange 12b may be fixed to the bottom side or surface 4b, as shown, for example, by FIG. 4. The hemispheres 12a and 12c may be fixed to adjacent hemispheres 10c and 14a, respectively, as shown by FIG. 7.

Bell 14 may include hemispheres or substantially shaped as hemispheres 14a and 14c which are connected together by flange 14b. The flange 14b may be fixed to the bottom side or surface 4b, as shown, for example, by FIG. 3. The hemispheres 14a and 14c may be fixed to adjacent hemispheres 12c and 16a, respectively, as shown by FIG. 7.

Bell 16 may include hemispheres or substantially shaped as hemispheres 16a and 16c which are connected together by flange 16b. The flange 16b may be fixed to the bottom side or surface 4b, as shown, for example, by FIG. 5. The hemispheres 16a and 16c may be fixed to adjacent hemispheres 14c and 6a, respectively, as shown by FIG. 7.

Each of bells 6, 8, 10, 12, 14, and 16 typically has one or more openings leading to the respective inner chamber within the respective sphere to allow sound from within the respective sphere caused by rattling of one or more balls or other objects to come out through the one or more openings.

For example, bell 6 has openings 6d and 6e leading to its inner chamber. Similarly or identically, bell 8 has openings 8d and 8e leading to its inner chamber; bell 10 has openings 10d and 10e leading to its inner chamber; bell 12 has openings 12d and 12e leading to its inner chamber; bell 14 has openings 14d and 14e leading to its inner chamber; and bell 16 has openings 16d and 16e leading to its inner chamber.

Each of bells 6, 8, 10, 12, 14, and 16, typically has an inner chamber, inside a sphere formed by their respective connected hemispheres, in which moves one or more balls, which may be steel balls which rattle around inside the respective sphere to make a ringing sound. For example, as shown by FIG. 7, bells 6, 8, 10, 12, 14, and 16 may include balls 6f, 8f, 10f, 12f, 14f, and 16f, each of which is shown by a dashed line circle, because each of balls 6f, 8f, 10f, 12f, 14f, and 16f typically would not be visible from the view of FIG. 7.

It is critical, in at least one embodiment, that each ball of balls 6f, 8f, 10f, 12f, 14f, and 16f, has a diameter which is greater than the diameter of any holes of its respective hemispheres. For example, ball 6f would typically have a diameter which is greater than the diameters of holes 6d and 6e in bell 6, so that ball 6f cannot escape from the inner chamber of bell 6 through the holes 6d and 6e. Since the bell 6 is sealed, other than openings 6d and 6e, the ball 6f cannot escape from the inner chamber of bell 6.

Figure 8:
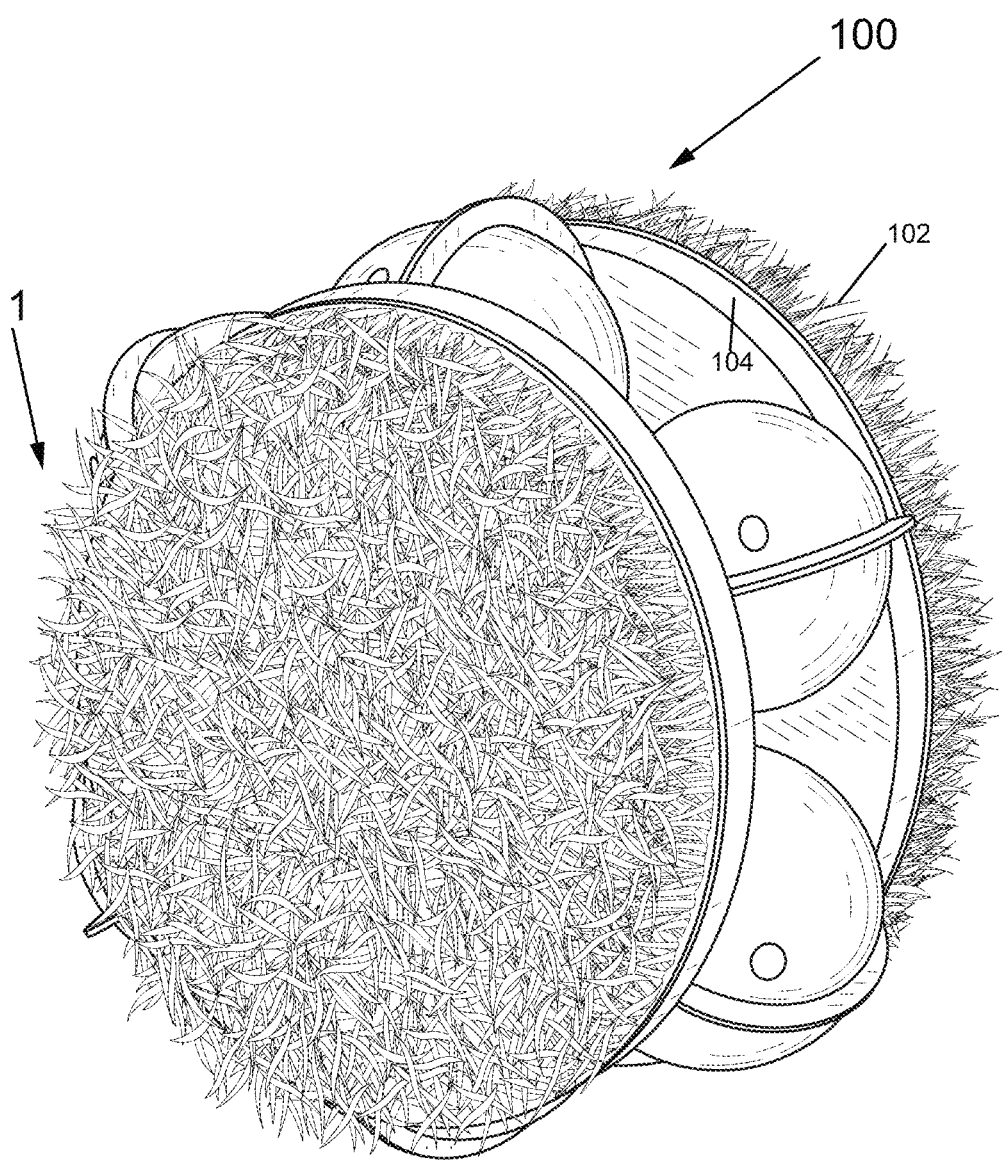
FIG. 8 is a right side, top, and front perspective view of the pet apparatus in combination with a bottom disk and a bottom turf section.
Figure 9:
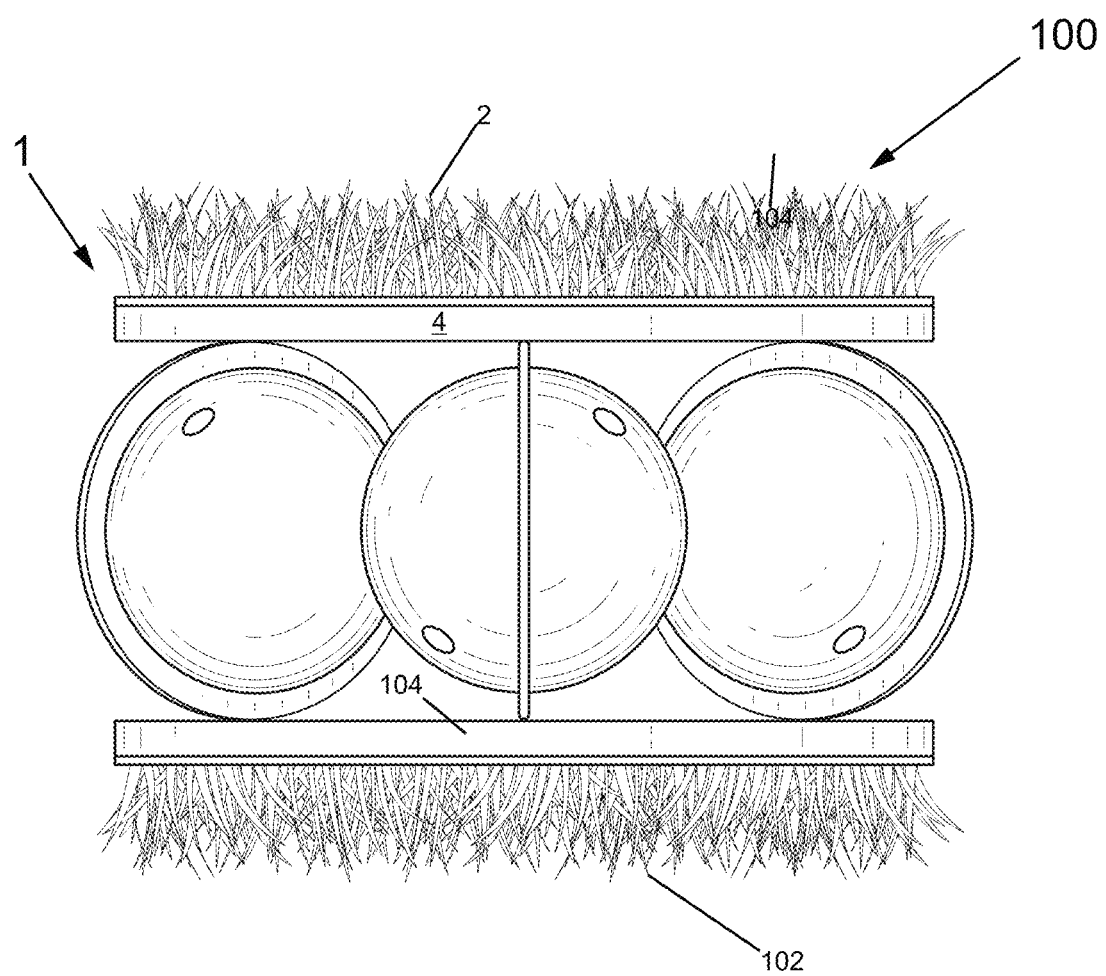
FIG. 9 is a front elevational view of the pet apparatus in combination with the bottom disk and the bottom turf section.
Figure 10:
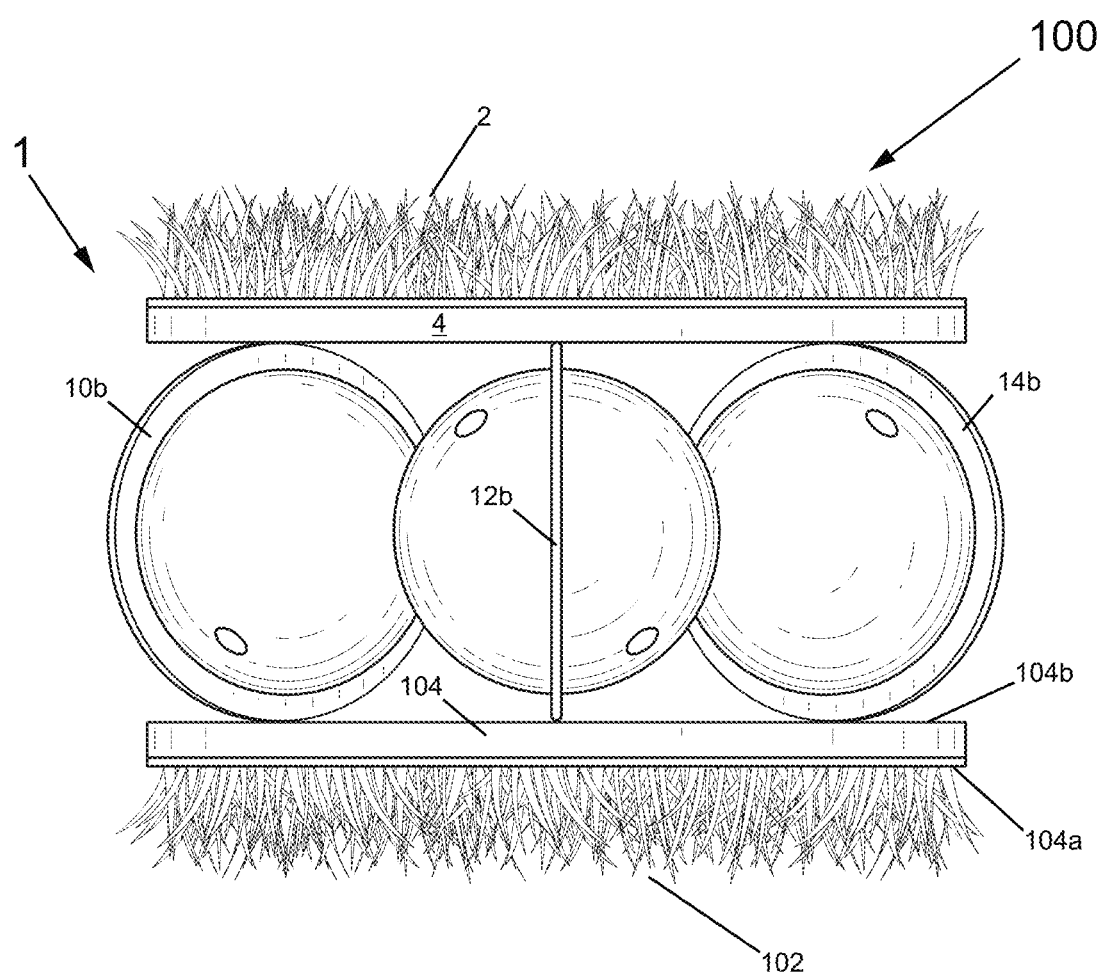
FIG. 10 is a rear elevational view of the pet apparatus in combination with the bottom disk and the bottom turf section.
Figure 11:
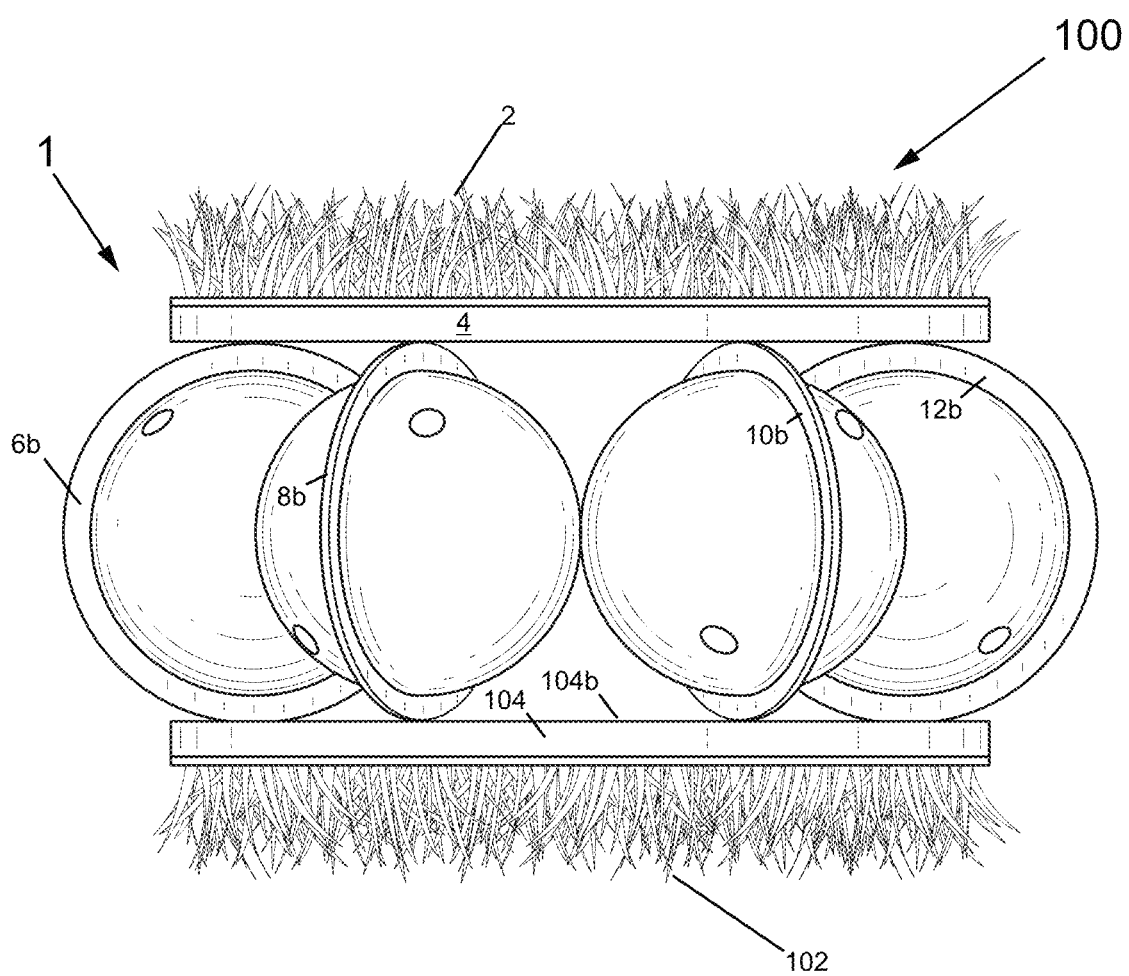
FIG. 11 is a right side elevational view of the pet apparatus in combination with the bottom disk and the bottom turf section.
Figure 12:
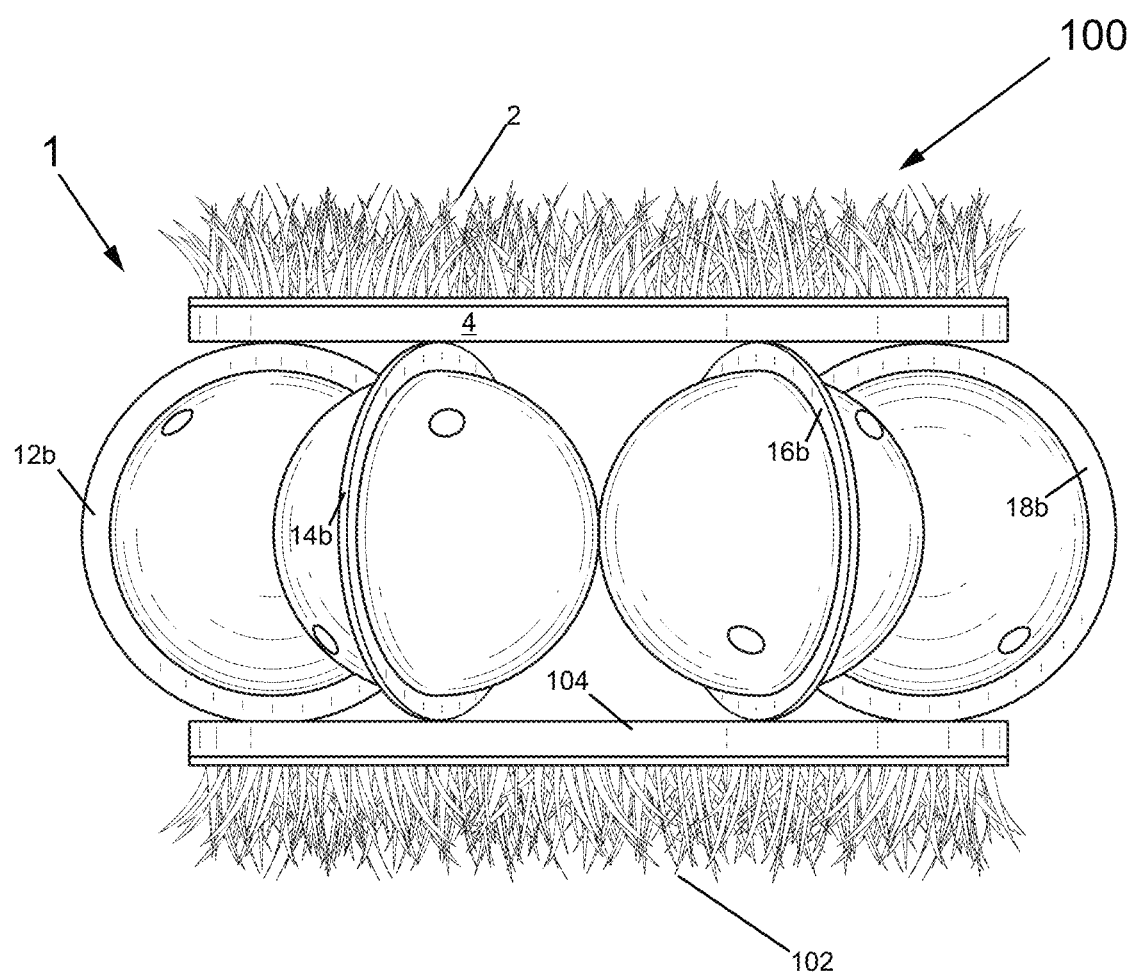
FIG. 12 is a left side elevational view of the pet apparatus in combination with the bottom disk and the bottom turf section.
Figure 13:
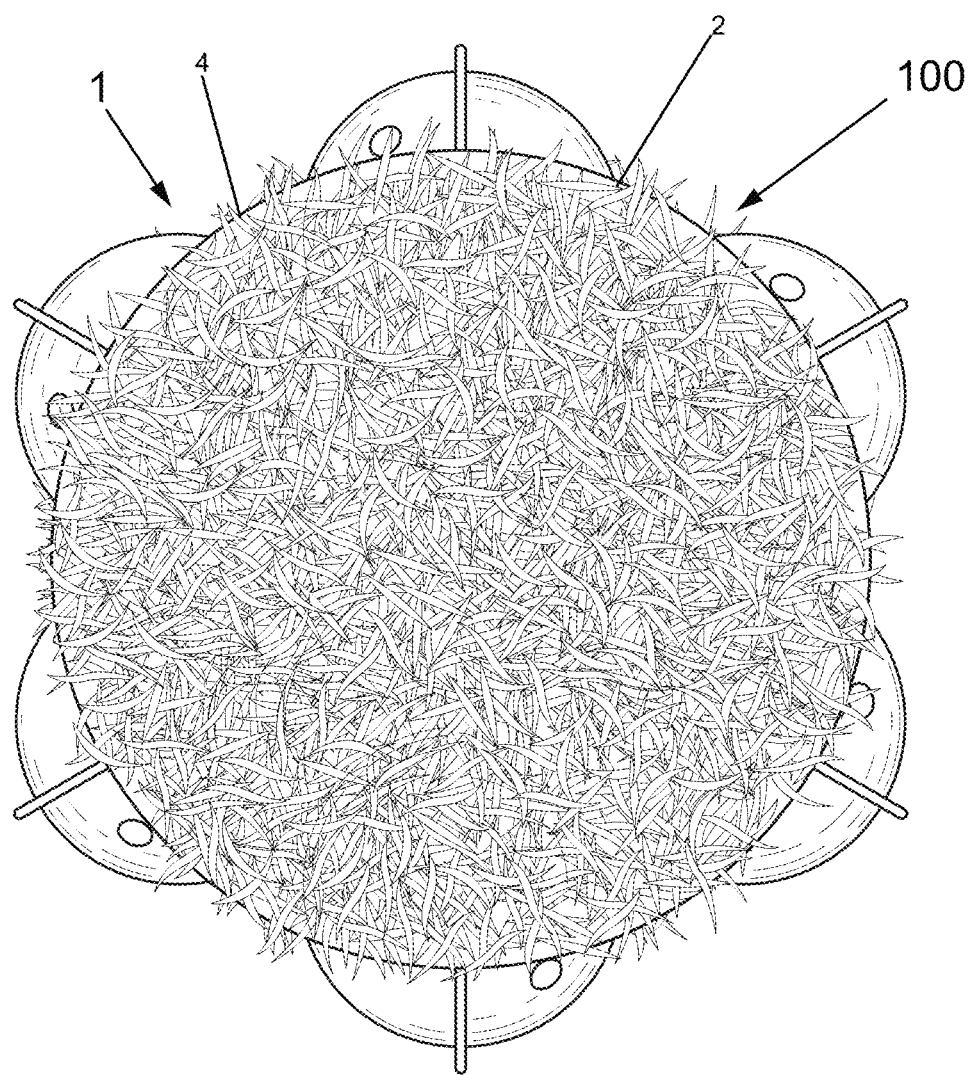
FIG. 13 is a top plan view of the pet apparatus in combination with the bottom disk and the bottom turf section.
Figure 14:
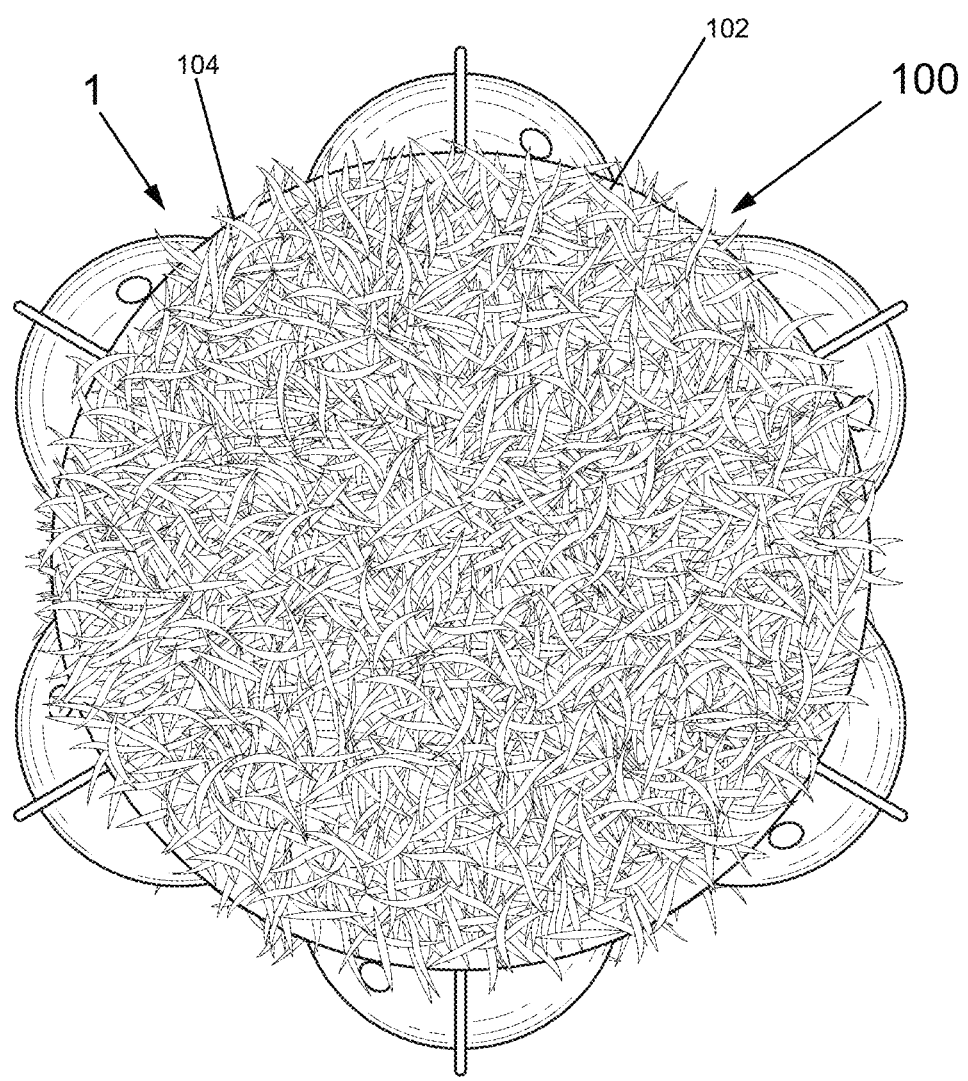
FIG. 14 is a bottom plan view of the pet apparatus in combination with the bottom disk and the bottom turf section.

FIG. 8 is a right side, top, and front perspective view of a pet apparatus 100, in accordance with an embodiment of the present invention. The pet apparatus 100 may include the pet apparatus 1, with a disk or base 104 attached to the bottom of the pet apparatus 1, and with a section of artificial turf 102 attached to the bottom of the disk 104. FIG. 9 is a front elevational view of the pet apparatus 100 of FIG. 8. FIG. 10 is a rear elevational view of the pet apparatus 100 of FIG. 8. FIG. 11 is a right side elevational view of the pet apparatus 100 of FIG. 8. FIG. 12 is a left side elevational view of the pet apparatus 100 of FIG. 8. FIG. 13 is a top plan view of the pet apparatus 1100 of FIG. 8. FIG. 14 is a bottom plan view of the pet apparatus 100 of FIG. 8.

As shown by FIGS. 8-14 the pet apparatus 100 includes section of artificial turf 102, which is fixed to a bottom side or surface 104a (shown by FIG. 10) of the base or disk 104.

The flange 6b may be fixed to the top side or surface 104b, as shown, for example, by FIG. 11.

The flange 8b may be fixed to the top side or surface 104b, as shown, for example, by FIG. 11.

The flange 10b may be fixed to the top side or surface 104b, as shown, for example, by FIG. 11.

The flange 12b may be fixed to the top side or surface 104b, as shown, for example, by FIG. 11.

The flange 14b may be fixed to the top side or surface 104b, as shown, for example, by FIG. 10.

The flange 16b may be fixed to the top side or surface 104b, as shown, for example, by FIG. 12.

In at least one embodiment, each of the apparatus 1 and/or the apparatus 100 solve the problem of not knowing when your pet has to go outside to the bathroom. Each of the apparatus 1 and/or 100 is portable and can be brought with a person and used anywhere for their pet, such as a dog or cat.

In at least one embodiment, instructions are included that will teach someone easy steps to get their pet to alert their owner by ringing one or more of the bells 6, 8, 10, 12, 14, and 16 of either the apparatus 1 and/or the apparatus 100. The ringing noise lets a person know that the pet has to urinate or defecate. The pet will be taught to use their paw or nose to ring one or more of the bells 6, 8, 10, 12, 14, and/or 16, such as by hitting or otherwise contacting a part of the apparatus 1 and/or the apparatus 100. Once one or more of the bells 6, 8, 10, 12, 14, and/or 16 are rung, the ringing of the one or more bells alerts someone that the pet has to go outside to urinate or defecate. The apparatus 1 and/or apparatus 100 can be used with any kind of pet.

In operation, the apparatus 1 may be set on a floor surface, so that the bottom of bells 6, 8, 10, 12, 14, and 16 contacts the floor surface, while the top of bells 6, 8, 10, 12, 14, and 16 is fixed to disc 4, and the turf section 2 is on top of the disc 4.

A pet is allowed to smell the apparatus 1 and/or apparatus 100 to get used to it. For the apparatus 100, one of the turf sections 2 and 102 may be set on and in contact with a floor surface.

In other embodiments, the apparatus 1 and/or apparatus 100 may be set on a floor surface on any manner.

After setting the apparatus 1 and/or apparatus 100 on a floor surface, next it is determined when a pet needs to urinate or defecate and then the pet is walked over to the apparatus 1 and/or apparatus 100.

Next a person picks up a paw of the pet and taps one or more of the bells 6, 8, 10, 12, 14, and/or 16, with the paw of the pet, and immediately praises the pet and lets the pet outside to go urinate or defecate outside. This process is repeated, i.e. the next time the pet needs to urinate or defecate the person again walks the pet to the apparatus 1 and/or apparatus 100, picks up the paw of the pet, immediately praises the pet and lets the pet outside to go to urinate or defecate outside. This process is repeated until the pet rings the bells 6, 8, 10, 12, 14, and/or 16 without any assistance, i.e. by hitting or contacting the apparatus 1 and/or the apparatus 100; and when the pet does this, the pet is let outside to urinate and/or defecate.

The apparatus 1 and/or the apparatus 100 are portable and can be used in any room the pet owner or other person chooses or taken on the road with a pet owner or other person. Friends and family will be marveled to watch your pet, on their own, ring one or more of the bells 6, 8, 10, 12, 14, and/or 16 to alert owners to let them out.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:
1. An apparatus comprising:
a first turf section;
a first disc having a flat top surface and a flat bottom surface opposite the top surface, wherein the first turf section is fixed to the top surface of the first disc; and
a plurality of bells are directly connected to the bottom surface of the first disc, wherein each of the plurality of bells has a top and a bottom;
wherein contacting the first turf section causes one or more of the plurality of bells to ring; and wherein the apparatus is configured to be set on a floor surface, so that the bottoms of the plurality of bells contact the floor surface while the tops of the plurality of bells are fixed to the bottom surface of the first disc.

2. The apparatus of claim 1 wherein
each of the plurality of bells is on a first plane.

3. The apparatus of claim 2 wherein
the plurality of bells substantially defines a closed geometric shape.

4. The apparatus of claim 1 wherein
the first turf section is artificial turf.

5. The apparatus of claim 4 wherein
the first disc is made from a material selected from the group consisting of wood, metal, and rubber.

6. The apparatus of claim 1 wherein
each of the plurality of bells includes first and second hemispheres connected together by a flange, wherein each flange of each of the plurality of bells is fixed to the bottom of the first disc, and each of the first and second hemispheres of each of the plurality of bells are spaced apart from the bottom of the first disc by the corresponding flange of each of the plurality of bells.

7. An apparatus comprising:
a first turf section;
a first disc having a flat top surface and a flat bottom surface opposite the top surface, wherein the first turf section is fixed to the top surface of the first disc;
a plurality of bells directly connected to the bottom surface of the first disc, wherein each of the plurality of bells has a top and a bottom;
a second disc having a flat top surface and a flat bottom surface, wherein the bottoms of the plurality of bells are directly fixed to the top surface of the second disc; and
a second turf section, wherein the second turf section is fixed to the bottom surface of the second disc
wherein contacting the first turf section or the second turf section causes one or more of the plurality of bells to ring;
and wherein the apparatus is configured to be set on a floor surface, so that a bottom of the second turf section contacts the floor surface while a top of the second turf section is fixed to a bottom surface of the second disc, and while the bottoms of the plurality of bells are fixed to the top surface of the second disc, and the tops of the plurality of bells are fixed to the bottom surface of the first disc, and the first turf section is fixed to the top surface of the first disc.

8. The apparatus of claim 7 wherein
the first turf section is artificial turf; and
the second turf section is artificial turf.

9. The apparatus of claim 8 wherein
the first disc is made from a material selected from the group consisting of wood, metal, and rubber; and
the second disc is made from a material selected from the group consisting of wood, metal, and rubber.

10. The apparatus of claim 7 wherein
each of the plurality of bells includes first and second hemispheres connected together by a flange, wherein each flange of each of the plurality of bells is fixed to the bottom of the first disc and the top of the second disc, and each of the first and second hemispheres of each of the plurality of bells are spaced apart from the bottom of the first disc and from the top of the second disc by the corresponding flange of each of the plurality of bells.

11. A method comprising the steps of:
teaching a pet to contact an apparatus so that the apparatus will ring, when the pet needs to urinate or defecate; and
in response to the pet contacting the apparatus to cause the apparatus to ring, opening a door to let a pet go outside of a building to allow the pet to urinate or defecate; and
wherein the apparatus includes:
a first turf section;
a first disc having a flat top surface and a flat bottom surface opposite the top surface, wherein the first turf section is fixed to the top surface of the first disc; and
a plurality of bells directly connected to the bottom surface of the first disc, wherein each of the plurality of bells has a top and a bottom;
wherein contacting the first turf section causes one or more of the plurality of bells to ring;
and wherein the apparatus is configured to be set on a floor surface, so that the bottoms of the plurality of bells contact the floor surface while the tops of the plurality of bells are fixed to the bottom surface of the first disc.

12. The method of claim 11 wherein
each of the plurality of bells is on a first plane.

13. The method of claim 12 wherein
the plurality of bells substantially defines a closed geometric shape.

14. The method of claim 11 wherein
the first turf section is artificial turf.

15. The method of claim 14 wherein
the first disc is made from a material selected from the group consisting of wood, metal, and rubber.

16. The method of claim 11 wherein
each of the plurality of bells includes first and second hemispheres connected together by a flange, wherein each flange of each of the plurality of bells is fixed to the bottom of the first disc, and each of the first and second hemispheres of each of the plurality of bells are spaced apart from the bottom of the first disc by the corresponding flange of each of the plurality of bells.

17. A method comprising the steps of:
teaching a pet to contact an apparatus so that the apparatus will ring, when the pet needs to urinate or defecate; and
in response to the pet contacting the apparatus to cause the apparatus to ring, opening a door to let a pet go outside of a building to allow the pet to urinate or defecate; and
wherein the apparatus includes:
a first turf section;
a first disc having a flat top surface and a flat bottom surface opposite the top surface, wherein the first turf section is fixed to the top surface of the first disc;
a plurality of bells directly connected to the bottom surface of the first disc, wherein each of the plurality of bells has a top and a bottom;
a second disc having a flat top surface and a flat bottom surface, wherein the bottoms of the plurality of bells are directly fixed to the top surface of the second disc; and
a second turf section, wherein the second turf section is fixed to the bottom surface of the second disc
wherein contacting the first turf section or the second turf section causes one or more of the plurality of bells to ring;
and wherein the apparatus is configured to be set on a floor surface, so that a bottom of the second turf section contacts the floor surface while a top of the second turf section is fixed to a bottom surface of the second disc, and while the bottoms of the plurality of bells are fixed to the top surface of the second disc, and the tops of the plurality of bells are fixed to the bottom surface of the first disc, and the first turf section is fixed to the top surface of the first disc.

18. The method of claim 17 wherein
the first turf section is artificial turf; and
the second turf section is artificial turf.

19. The apparatus of claim 18 wherein
the first disc is made from a material selected from the group consisting of wood, metal, and rubber; and
the second disc is made from a material selected from the group consisting of wood, metal, and rubber.

20. The method of claim 17 wherein
each of the plurality of bells includes first and second hemispheres connected together by a flange, wherein each flange of each of the plurality of bells is fixed to the bottom of the first disc and the top of the second disc, and each of the first and second hemispheres of each of the plurality of bells are spaced apart from the bottom of the first disc and from the top of the second disc by the corresponding flange of each of the plurality of bells.

\* \* \* \* \*